United States Patent [19]

Vail

[11] Patent Number: 5,057,334

[45] Date of Patent: Oct. 15, 1991

[54] PROCESS FOR RECOVERY OF CELLULOSE

[75] Inventor: William J. Vail, Cumberland, Md.

[73] Assignee: Ort's Inc., LaVale, Md.

[21] Appl. No.: 667,533

[22] Filed: Mar. 11, 1991

Related U.S. Application Data

[63] Continuation-in-part of Ser. No. 552,073, Jul. 13, 1990, abandoned.

[51] Int. Cl.$^5$ ............................................. A23B 1/20
[52] U.S. Cl. .................................. 426/634; 426/431; 426/478
[58] Field of Search ............... 426/634, 436, 431, 478

[56] References Cited

U.S. PATENT DOCUMENTS

| | | | |
|---|---|---|---|
| 4,307,121 | 12/1984 | Thompson | 426/636 |
| 4,486,459 | 12/1984 | Thompson | 426/634 |
| 4,649,113 | 3/1987 | Gould | 435/165 |
| 4,774,098 | 9/1988 | Gould et al. | 426/549 |
| 4,806,475 | 2/1989 | Gould | 435/165 |
| 4,826,567 | 5/1989 | Gratzl | 162/72 |
| 4,919,952 | 4/1990 | Sadaranganey et al. | 426/436 |
| 4,957,599 | 9/1990 | Chou et al. | 162/78 |

*Primary Examiner*—Marianne Cintins
*Assistant Examiner*—Helen Pratt

[57] ABSTRACT

The present invention is directed to a process for the production of an improved purified short fiber cellulose suitable for human consumption from agricultural by-product materials, such as legume hulls, preferably soybean hulls. The legume hulls are comminuted into a particulate feed which is admixed with water to form a slurry. The slurried particulate legume hulls are oxidized, hydrolyzed and extracted with a caustic oxidizing agent utilizing an initial pH of about 12 to effect solubilization of the greater portion of non-cellulose material in the feed. A solid cellulose containing material is thereafter removed from the slurry, for example, by filtration or centrifugation. The recovered solid mass is slurried in water and the resulting slurry if pH adjusted to about 7 by the addition of phosphoric acid. The resulting suspension is agitated and $H_2O_2$ is added, and the mixture is heated to promote bleaching and breakdown of the non-cellulose components. The resulting mixture is subjected to a separation operation and a residue is recovered which consists primarily of microcrystalline alpha-cellulose fibers.

8 Claims, No Drawings

PROCESS FOR RECOVERY OF CELLULOSE

CROSS-REFERENCE TO RELATED APPLICATION

This is a continuation-in-part of Ser. No. 07/552,073, filed July 13, 1990, abandoned April 30, 1991.

BACKGROUND OF THE INVENTION

Cellulose has previously been recovered from agricultural by-products such as legume hulls by the utilization of a chlorine oxidizing agent as displayed in Thompson U.S. Pat. No. 4,486,459 which is herein incorporated by reference. The utilization of this prior process produces, as a by-product, waste water containing chlorinated phenolic products. The waste water also contains free chlorine that inhibits microbial action and microbial breakdown of the waste in aerated samples, thereby creating a delay for subsequent disposal of the waste. Aeration ponds containing such wastes emanate extreme odors.

It is an object of the instant invention to provide a process for recovering organoleptically improved cellulose from legume hulls by employing chlorine-free oxidizing agents such that no chlorinated phenolic by-products are produced for disposal in the waste water and no free chlorine is present in the waste water to prevent microbial action.

It is a further object of the present invention to provide a process to recover cellulose from legume hulls, said process having reduced process time in comparison to chlorine oxidation techniques.

SUMMARY OF THE INVENTION

The present invention is directed to a process for the recovery of an improved purified short fiber cellulose suitable for human consumption from agricultural by-product materials, especially hulls of edible legumes, preferably soybean hulls. The legume hulls are comminuted into a particulate matter feed which is formed into a water slurry and thereafter oxidized, hydrolyzed and extracted with a caustic oxidizing agent to effect solubilization of the greater portion of non-cellulose material in the feed. A solid cellulose containing material is thereafter removed from the slurry, for example, by filtration or centrifugation. The recovered solid mass is slurried in water and pH adjusted to about 7 by the addition of phosphoric acid. The slurry is preferably agitated and $H_2O_2$ is added thereto, and the mixture is heated to promote bleaching and breakdown of the non-cellulose materials. A bleached cellulose-containing residue is recovered, e.g., by filtration or centrifugation. The recovered residue consists primarily of microcrystalline alpha-cellulose fibers which are easily reduced to powder form by milling and classifying, and may be used in food products as an ingredient, in drugs as a diluent and excipient, in talcum powder as a nonallergic component, and in other cellulose-containing or enhanced products contemplated for human consumption or use.

The process of the invention herein comprises the steps of (a) forming a slurry of particulate legume hulls in water, (b) adding caustic oxidizing agent to the slurry to raise the pH to about 12, (c) maintaining a highly alkaline pH in said slurry for 6½ to 23 hours during which the temperature of the slurry is maintained at 190° F. to 210° F. for at least 30 minutes, to oxidize, hydrolyze and extract the particulate legume hulls, thereby to solubilize the greater portion of the non-cellulose material present therein and form a pulp which consists predominantly of cellulose, in the slurry, (d) separating the pulp from the slurry, (e) redispersing the separated pulp in water to form a further slurry, (f) adjusting the pH of the further slurry to be in the range from about 6.5 to 7.5 by the addition of phosphoric acid, (g) adding to the pH adjusted slurry resulting from (f) a bleaching effective amount of aqueous hydrogen peroxide solution, and mixing, and heating the resulting admixture to a below boiling temperature to promote breakdown of any non-cellulose material present and bleaching of the pulp, and (h) separating from the resulting admixture a bleached pulp composition consisting predominantly of short fiber cellulose suitable for human consumption.

DETAILED DESCRIPTION

The raw materials that may be employed in the present process are any relatively non-ligneous agricultural by-products containing a significant alpha-cellulose content. The cellulose content of an agricultural by-product can be estimated approximately by determining the crude fiber content thereof by analytical procedure AOAC 7.050–7.054. This crude assay actually removes 20–60% of the cellulose but leaves significant quantities of hemicellulose and lignins that may be present. As previously indicated, the process herein is very advantageously used with legume hulls.

Examples of raw materials that may be used in the present process and an approximation of their usual analytical character in accordance with AOAC analytical procedure are indicated in the following table calculated to a bone dry basis. The equilibrium moisture present is normally about 5%.

| Raw Material | Crude Fiber | Ash | Crude Protein** | Lipids (Ether Extract) |
|---|---|---|---|---|
| Soybean hull | 43% | 4.4% | 8.9% | 2% |
| Pea hull | 35% | 3.0% | 14.4% | 1% |
| Corn bran | 20% | 1.7% | 5.5% | 2% |
| Beet pulp-dried | 23% | 4.2% | 8.9% | 6% |
| Oat hull | 30% | 4.2% | 3.6% | 1% |

**Amine nitrogen 6.25

These by-product materials are readily available in large quantity and at low cost since most of such materials are normally discarded. Other satisfactory raw materials are readily available also and may be employed so long as such materials have a "crude fiber" content of at least 15%, a lignin level under about 7% and possess a relatively high pectin and/or hemicellulose content. Soybean hulls are the preferred raw material, yielding a maximum amount of superior grade cellulose for a given amount of processing and chemical reagent expense. The process of the present invention is not applicable on a practical basis to wood or stalk portions of plants.

The agricultural by-products suitable for use in the present process can be treated as obtained from their source as by-products, but it has been found from an economics standpoint with respect to chemicals and processing time required, that such by-products are desirably first size-reduced to be no finer than through a 20 mesh screen, on a 24 mesh screen, by a hammer milling or an equivalent procedure. The by-products in a coarsely ground granular state permit easier slurrying, faster reactions and shorter processing times. However, finer particles may be used without apparent effect on cellulose yield.

A preferred process herein is described below.

In step (a) of the process described in the Summary of Invention section above, one hundred parts by weight of agricultural by-product, preferably soybean hulls, in a ground state, are admixed with 500 to 1200 parts by weight of water in a suitable reactor tank and stirred into suspension.

In step (b), a suitable amount of a caustic oxidizing agent, such as potassium hydroxide or sodium carbonate, preferably sodium hydroxide (20-30%), is added to initially adjust the pH of the liquid phase to approximately 12, for example, to 12.4 to 12.5.

In step (c), which may be characterized as a peroxide-free alkaline treatment step, a highly alkaline pH of at least 0.5 is maintained in the slurry for 6½ to 23 hours at temperatures such as to obtain oxidation, hydrolysis and extraction of the legume hulls, thereby to solubilize the greater portion of the non-cellulose material present therein; if the pH should drop below a desired minimum value, normally 0.5, it is readily restored to said value or to exceed said value by addition of a suitable amount of aqueous caustic oxidizing agent solution. Thus, a pH ranging from 10.5 to 12.5 is preferably maintained in step (c). In one embodiment the suspension is maintained at ambient temperature for several hours, i.e., 6-8 hours, and then the temperature is raised to 190° to 210° F., preferably 200° to 210° F., very preferably to 205° F., and this temperature is maintained for 30 minutes to 5 hours, and aqueous caustic oxidizing agent solution is periodically added to restore the pH to about 12, and these conditions are such as to obtain partial breakdown of the raw material agricultural by-product and solubilization of non-cellulosic components by oxidation and alkaline hydrolysis and extraction of gums, lignin, proteins, pectin and other non-cellulosic components. In a different and very preferred embodiment, where the slurry is formed using water initially at a temperature of 120° to 150° F. (e.g., as a result of recovering heat from output from the process), and the pH is initially adjusted to about 12, very preferably to 12.4-12.5, with aqueous caustic oxidizing agent, the temperature is raised to 200° to 210° F., very preferably to 205° F., over a period of 1 to 3 hours, and then a temperature of 200° to 210° F. is maintained for 8 to 12 hours, and the pH is brought up to 10.5 by addition of aqueous caustic oxidizing agent solution, if it drops below that level (normally, the pH would drop below 0.5 near the end of step (c) if it does so at all). In all cases, step (c) is carried out without hydrogen peroxide present. The oxidation in step (c) provides deamination of protein. The hydrolysis in step (c) provides solubilization of coniferyl alcohols and other non-cellulosic components to products which are extractable under the alkaline conditions.

In step (d), the alkaline treated slurry is centrifuged or filtered, and pulp residue consisting predominantly of cellulose is recovered, and the liquid phase is discarded.

In step (e), the pulp residue is suspended in approximately 0.5 to 5 gallons of water per pound of residue. Water at 120° to 150° F., heated from ambient by heat exchange with output streams, is very preferably used.

In step (f), the pH is adjusted with a suitable amount of aqueous acid, e.g., 70 to 85% phosphoric acid, to reduce the pH to be essentially neutral, i.e., to range from 6.5 to 7.5, preferably to a range from 7.0 to 7.5, very preferably to a range from 7.1 to 7.2.

In step (g), the neutralized suspension is agitated and a bleaching effective amount, namely 0.003 to 0.02 parts by weight, e.g., 0.010 to 0.015 parts by weight or 0.004 to 0.008 parts by weight, of aqueous hydrogen peroxide solution per part by weight of the total suspension, preferably 50–70% $H_2O_2$, is added to the neutralized suspension and the resulting admixture is heated to 190° to 210° F., preferably to 206° F. to 210° F., very preferably to 208° F. over a period of 1 to 3 hours and is maintained at this temperature for one to five hours to promote further breakdown of non-cellulosic materials and bleaching of the product. The conditions in step (c) help to maximize the bleaching effect and minimize hydrogen peroxide usage as they cause denaturing of peroxidases and catalases which are present in the by-product feed and which would otherwise degrade bleaching agent hydrogen peroxide. The phosphoric acid usage in step (f) aids in maintaining the pH as the salt resulting from neutralization provides buffering against the lowering of the pH to below 6.5.

In step (h), the peroxide treated suspension is filtered or centrifuged to provide a supernatant and a bleached residue and the bleached residue is recovered. Said bleached residue contains a major portion of microcrystalline alpha-cellulose fibers. Silica and some lipids (including steroids and unsaponifiables) are still present. The residue product may be dried and milled at this point if the lipids that may be present are not found objectionable.

Preferably, agitation is carried out throughout steps (a), (b), (c), (e), (f) and (g).

If it is desired to remove some or all of the lipids, they normally may be removed by extraction, for example, in one of three stages of the processing as described hereinafter. Firstly, lipids may be extracted from the raw starting material. Secondly, lipids may be extracted by treating water moist cellulose cake recovered in step (h). Thirdly, lipids may be extracted by treating dried product. In general, it will be found that lipids can be most easily extracted by treating the water moist cellulose cake obtained from the final separation step above or from dried cellulose cake by treating either with a solvent in which the lipids are selectively soluble. The lipids can be extracted from the raw starting material or from the dried cellulose product by treating either, for example, with mixed hexanes in the same manner as such an extraction is carried out in the preparation of soybean and other seed oils. Extraction of the lipids from water moist cellulose cake can be accomplished best by use of water miscible solvents, such as, for example, isopropyl and ethyl alcohols; this process has the advantage of removing the water from the cake as well as the lipid materials, thus leaving in its place a lower boiling solvent which ultimately can more easily be removed by vacuum stripping same from the cellulose. It is to be clearly understood that other solvents, such as, for example, esters, ketones, other alcohols, and the like, may be used if desired. In any case, only a very limited extraction suffices to remove essentially all lipids after processing, as the lipids are not bound to the purified cellulose.

The resultant material, wet with water or solvent, is readily stripped of this liquid by use of heat, vacuum, or both, to yield a white powder or slightly lumpy material which can readily be reduced to fine particle size by conventional means. The resultant dry powdered cellulose will be found to have a trace of nitrogen compounds present and a small ash content but, in general, the cellulose products are comparable analytically with the conventional wood derived cellulosic materials which are employed for human consumption.

The products made in accordance with the present invention have the important advantage of being naturally fine and the fibers are no doubt shortened by the treatment applied even if they are not appreciably altered chemically. The cellulose products of the present invention can be reduced to the 100–300 mesh size required for food and drug use, for example, by any suitable and well known milling operation. In this respect, the cellulose products of the present invention are quite unlike the long coarse fibers of processed wood or cotton cellulose which are very difficult to grind and size. Having more surface per unit weight, the cellulose produced in accordance with the present invention can carry more water and thus has enhanced functionality in the formulation of low caloric food analogs and approach the utility of microcrystalline cellulose in drug diluent applications at a lesser cost.

The process of the present invention is illustrated by the following specific examples.

EXAMPLE I

Thirteen thousand five hundred pounds of ground soybean hulls were mixed with 13,500 gallons of water and soaked at ambient temperature for six to seven hours. The pH of this solution was raised to 2 by the addition of 170 gallons of 30% caustic soda. The solution was cooked at 200°–210° F. for three hours. An additional 250 gallons of 30% caustic soda solution was added during cooking to maintain the pH at 12. The resulting slurry was centrifuged. The supernatant was discarded, and the residue, approximately 5,100 pounds derived from the soybean hulls, was resuspended in 4,500 gallons of water. The pH of the resulting slurry was lowered to 7 by the addition of 12.5 gallons of 75% phosphoric acid. The suspension was mixed and 27 gallons of 70% hydrogen peroxide was added. The resultant mixture was cooked for five hours at 210° F. The cooked mixture was centrifuged, and the recovered residue yielded a cellulose product of 38% by weight based on the original raw unextracted soybean hulls. The recovered cellulose fiber product displayed characteristics tabulated in Table 1 below and had improved organoleptic properties.

TABLE 1

| COMPOSITION | |
|---|---|
| Total Dietary Fiber = | 93.5% |
| Moisture = | 5.1% |
| Ash = | 0.8% |
| Protein = | 0.4% |
| Fat = | 0.2% |
| MICROBIOLOGICAL DATA | |
| Standard Plate Count = | Less than 10 |
| E. Coli = | Less than 3 |
| Mold = | Less than 10 |
| Yeast = | Less than 10 |
| Salmonella = | Negative |
| Shigella = | Negative |
| PHYSICAL PROPERTIES | |
| pH = | 6.5–7.0 |

TABLE 1-continued

| Color = | White |
|---|---|
| Flavor = | None |
| Particle Size = | 35 micrometers |
| Water Absorption = | 4:1 (4 times its weight) |

EXAMPLE II

Fifteen thousand gallons of water (at 130°–140° F. due to processing through a heat recovery system) and 13,500 pounds of ground soybean hulls are admixed to form a slurry. Sodium hydroxide (275 gallons of 30% NaOH) is added to the slurry with agitation, to adjust the pH to 12.4–12.5. The temperature of the slurry is raised to 205° F. over a 1½ hour period and the 205° F. temperature is maintained for 10 hours. Agitation of the slurry is carried out all during the time the temperature is raised to 205° F. and also all during the 10-hour 205° F. cook period thereafter. Following the 10-hour cook period, the slurry is centrifuged and the residue is recovered. The residue (estimated to be approximately 6750 pounds) is admixed in a slurry tank with 140°–140° F. water (temperature obtained by processing ambient temperature water through a heat recovery system). Once the admixture is formed, the pH is in the range of 9.8 to 10.2. The pH is adjusted to 7.1–7.2 by addition, with agitation, of 6.5 gallons of 75% phosphoric acid. Then 80 gallons of 50% hydrogen peroxide is introduced with agitation of the slurry, and the temperature of the slurry is raised to 208° F. over a 1½ hour period with continued agitation. The temperature is maintained at 208° F. and agitation is continued, for 4 hours. Then the slurry is centrifuged and the residue is recovered and dried to provide the final product. Analysis on the product gives the following: Total Dietary Fiber 92.7%. Alpha-cellulose content, 77.6%. Hemicellulose content, 14.9%. Lignin content, 2.35%.

Variations will be obvious to those skilled in the art. Thus, the scope of the invention is defined by the claims.

What is claimed is:

1. A process for the production of purified short fiber cellulose suitable for human consumption, from the hulls of edible legumes, comprising the steps of:
 (a) forming a slurry of particulate legume hulls in water,
 (b) adding caustic oxidizing agent to the slurry to raise the pH to about 12,
 (c) maintaining a highly alkaline pH in said slurry for 6½ to 23 hours during which the temperature of the slurry is maintained at 190° F. to 210° F. for at least 30 minutes, to oxidize, hydrolyze and extract the particulate legume hulls, thereby to solubilize the greater portion of the non-cellulose material present therein and form a pulp which consists predominantly of cellulose, in the slurry,
 (d) separating the pulp from the slurry,
 (e) redispersing the separated pulp in water to form a further slurry,
 (f) adjusting the pH of the further slurry to be in the range of from about 6.5 to 7.5 by the addition of phosphoric acid,
 (g) adding to the pH adjusted slurry resulting from (f) a bleaching effective amount of aqueous hydrogen peroxide solution, and mixing, and heating the resulting admixture to a below boiling temperature to promote breakdown of any non-cellulose material present and bleaching of the pulp, and (h) separating from the resulting admixture a bleached pulp composition consisting predominantly of short fiber cellulose.

2. The process as in claim 1 in which the caustic oxidizing agent is selected from the group consisting of sodium hydroxide, potassium hydroxide and sodium carbonate.

3. The process as in claim 1 in which the pH of the further slurry is adjusted to a pH of 7.to 7.2 by the addition of phosphoric acid.

4. The process of claim wherein in step (g) said temperature ranges from 190° F. to 210° F.

5. The process of claim 4 wherein in step (g), said temperature ranges from 206° F. to 210° F.

6. The process of claim wherein in step (c), the temperature of the slurry is maintained at 200° F. to 210° F. for at least 30 minutes.

7. The process of claim 6 wherein in step (c), the temperature of the slurry is maintained at 200° F. to 210° F. for 8 to 12 hours.

8. The process of claim 7 wherein in step (g), said temperature ranges from 206° F. to 210° F.

* * * * *